(12) United States Patent
Ghosh et al.

(10) Patent No.: US 7,695,240 B2
(45) Date of Patent: Apr. 13, 2010

(54) BUNDLING SYSTEM FOR LONG PRODUCTS

(75) Inventors: Pradip K. Ghosh, Worcester, MA (US); Bruno Maggioni, Milan (IT)

(73) Assignee: Morgan Construction Company, Worcester, MA (US)

( * ) Notice: Subject to any disclaimer, the term of this patent is extended or adjusted under 35 U.S.C. 154(b) by 0 days.

(21) Appl. No.: 12/463,774

(22) Filed: May 11, 2009

(65) Prior Publication Data

US 2009/0263231 A1    Oct. 22, 2009

Related U.S. Application Data

(63) Continuation of application No. 11/676,775, filed on Feb. 20, 2007.

(51) Int. Cl.
*A01D 90/08*    (2006.01)
*B65B 35/50*    (2006.01)
*B21C 47/24*    (2006.01)
*B65G 47/30*    (2006.01)

(52) U.S. Cl. ................ 414/802; 414/788.3; 414/788.5; 414/795.2; 414/776; 414/783; 198/403; 198/418.4

(58) Field of Classification Search ................ 198/374, 198/403, 418.4, 429–430, 468.2, 750.11, 198/750.13, 750.14; 414/331.01, 331.04, 414/331.05, 331.13, 331.14, 331.17, 763, 414/764, 772, 776, 779, 783, 788.2, 788.3, 414/788.5, 788.6, 789.8, 790.4, 791.9, 791.4, 414/794.9, 795, 795.2, 795.3, 924, 801, 802; 53/447, 536, 537, 540, 544

See application file for complete search history.

(56) References Cited

U.S. PATENT DOCUMENTS

| | | | | | |
|---|---|---|---|---|---|
| 3,506,109 | A | * | 4/1970 | Braas | 198/418.4 |
| 4,278,377 | A | * | 7/1981 | Elineau | 414/788.2 |
| 4,344,727 | A | * | 8/1982 | Chaloupka | 414/789.1 |
| 4,487,540 | A | * | 12/1984 | Buchheit | 414/788.2 |
| 4,969,313 | A | * | 11/1990 | Nonini et al. | 53/537 |
| 5,174,089 | A | * | 12/1992 | Poloni | 53/446 |
| 5,212,929 | A | * | 5/1993 | Castellan | 53/149 |
| 5,281,080 | A | * | 1/1994 | Dale | 414/788.4 |
| 5,380,146 | A | * | 1/1995 | Bordignon et al. | 414/791.4 |
| 5,570,995 | A | | 11/1996 | Offoiach | |
| 5,944,478 | A | | 8/1999 | Colombo et al. | |

FOREIGN PATENT DOCUMENTS

DE    4132231 A1 *   4/1993
JP    2002145448 A *   5/2002

* cited by examiner

*Primary Examiner*—Gregory W Adams

(57) ABSTRACT

A system for bundling long ferrous products comprises a roller table for delivering the products longitudinally to a receiving station. A cradle is spaced laterally from the receiving station and is constructed and arranged to receive and accumulate the products in bundle form. A stacker is positioned between the receiving station and the cradle, and a pre-stacker is positioned between the stacker and the receiving station. A transport system laterally advances products from the receiving station to the pre-stacker, and the pre-stacker operates in concert with the transport system to pre-stack multiple layers of the products into sub-bundles and to transfer the sub-bundles to the stacker, which then operates to deposit the sub-bundles in the cradle.

2 Claims, 9 Drawing Sheets

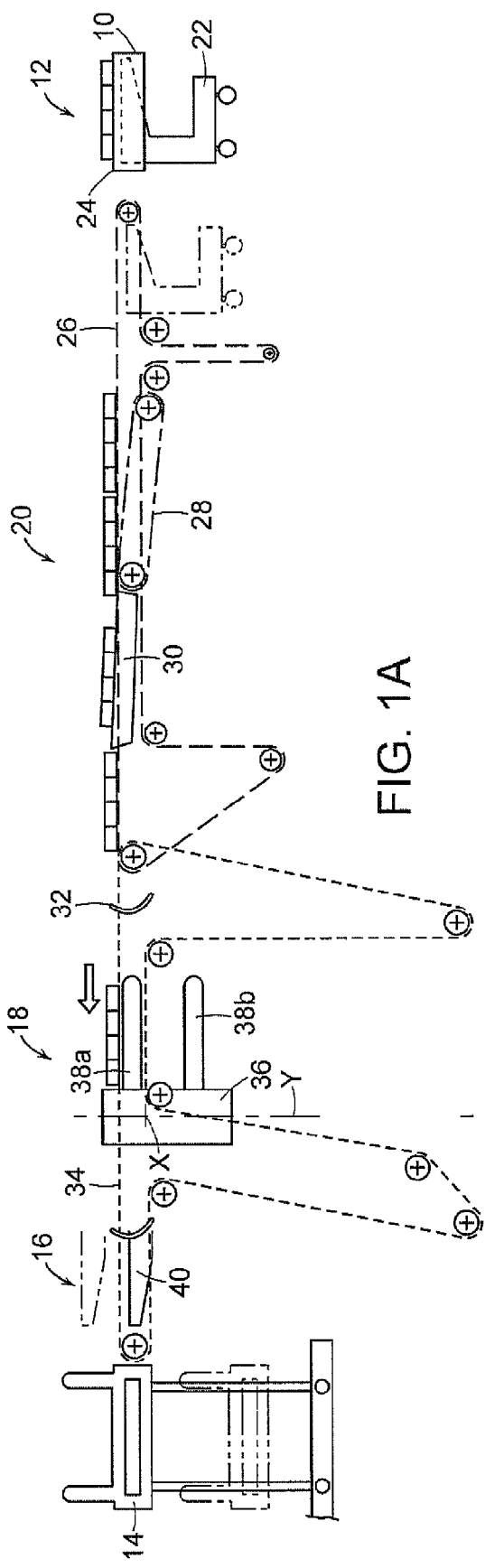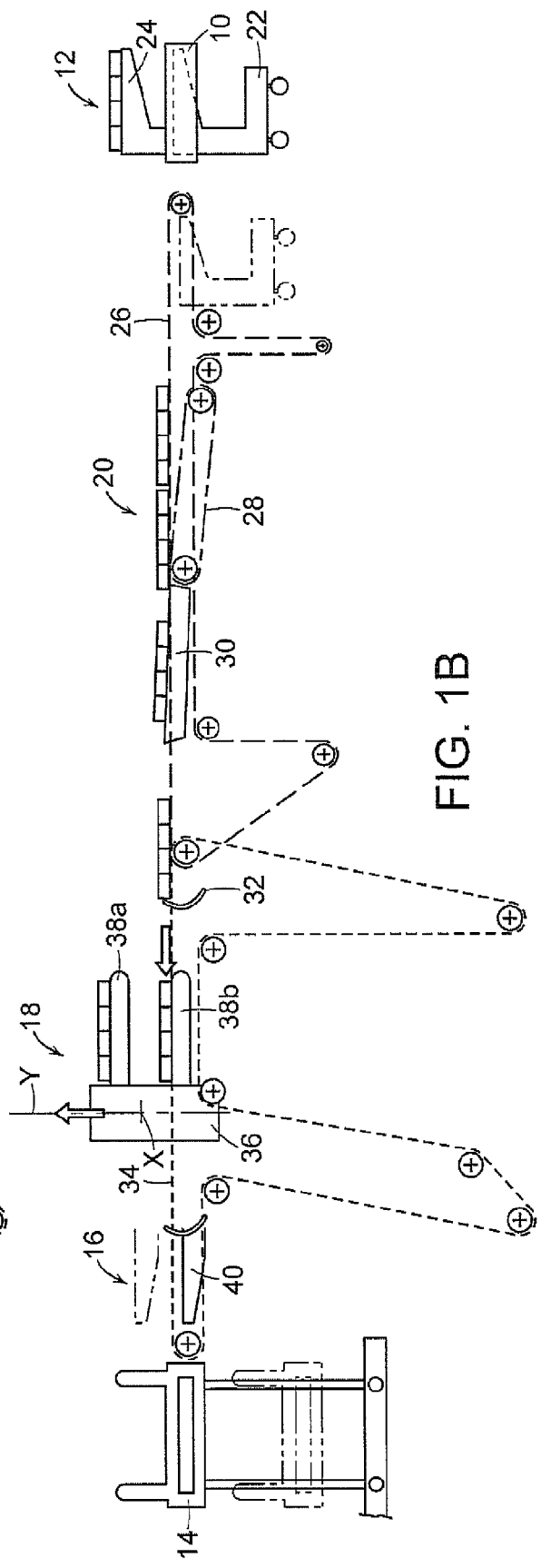
FIG. 1A
FIG. 1B

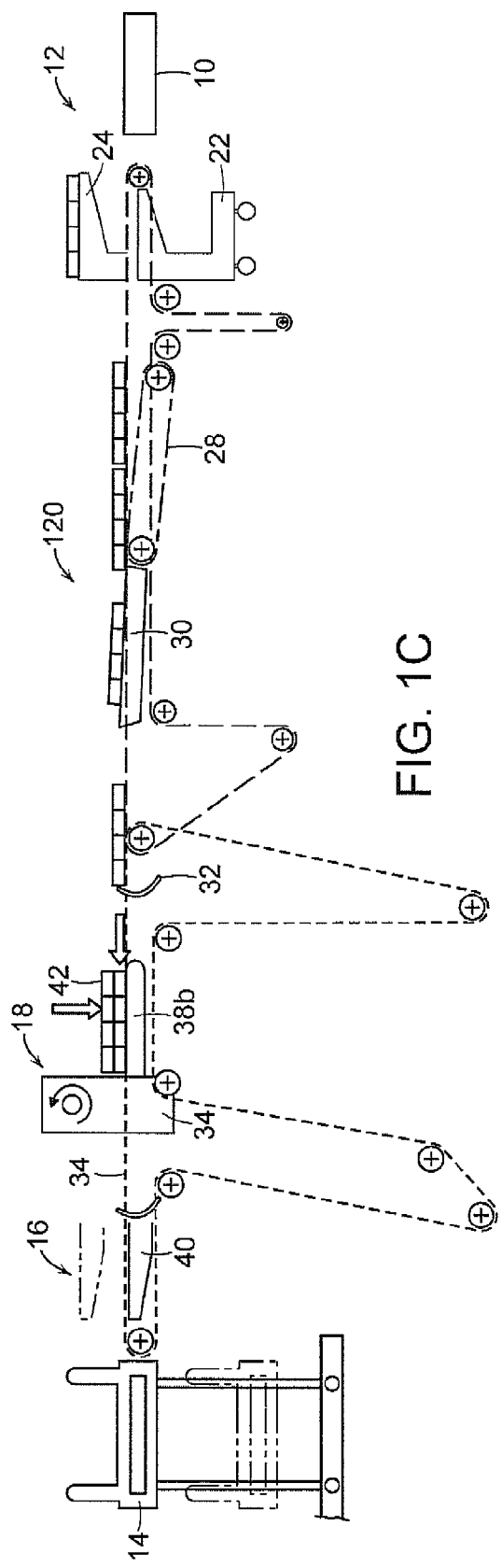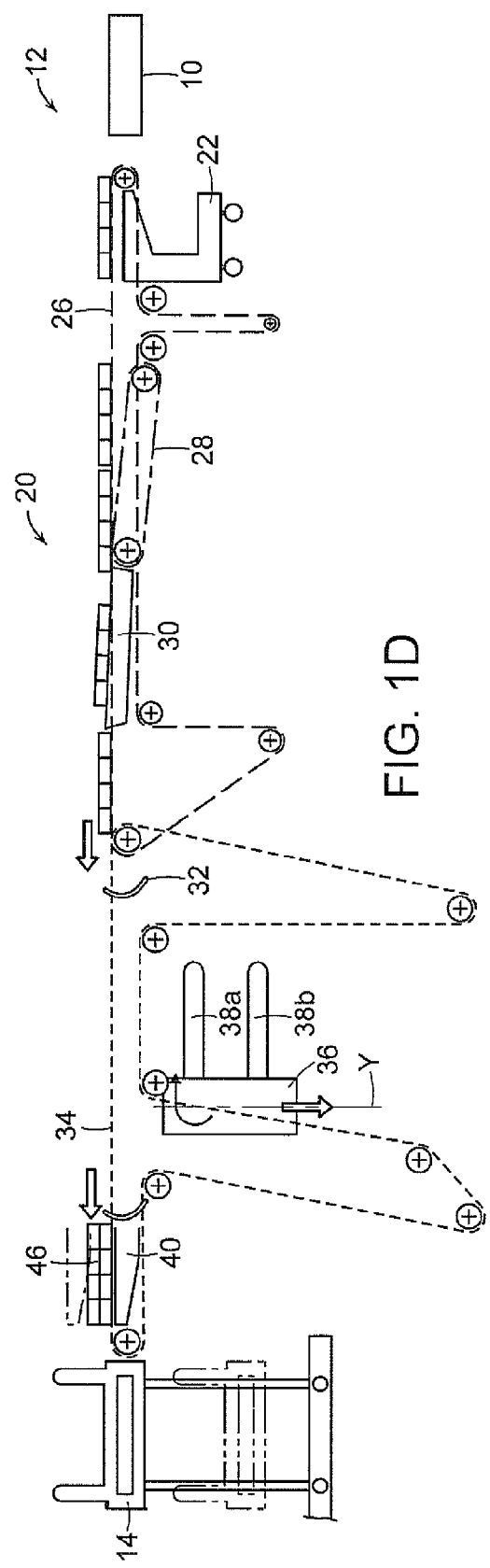

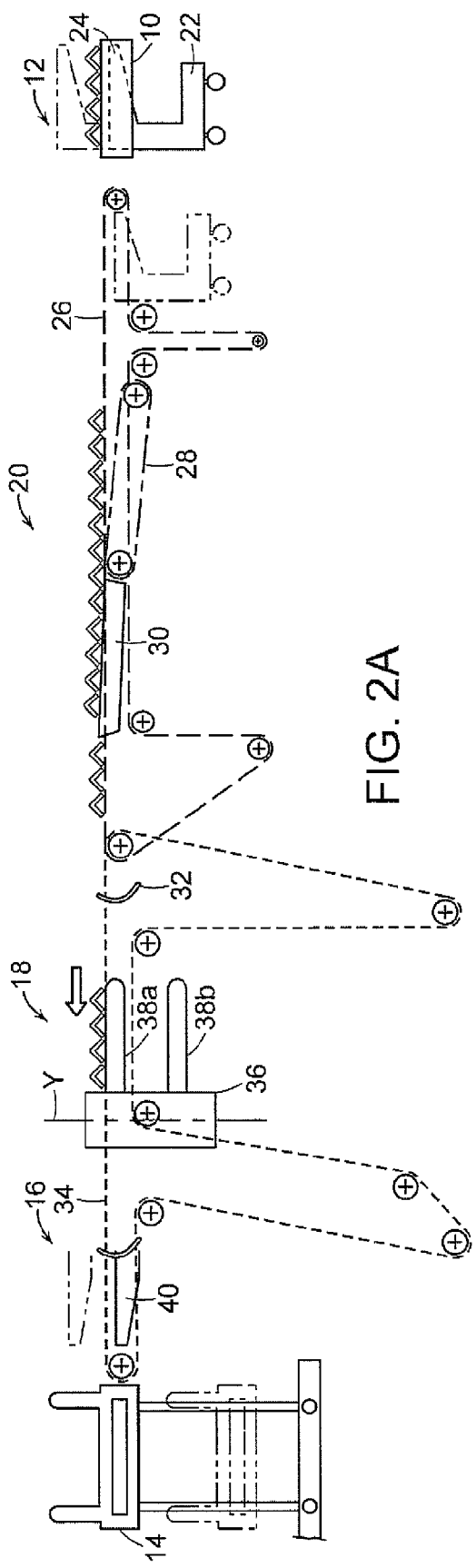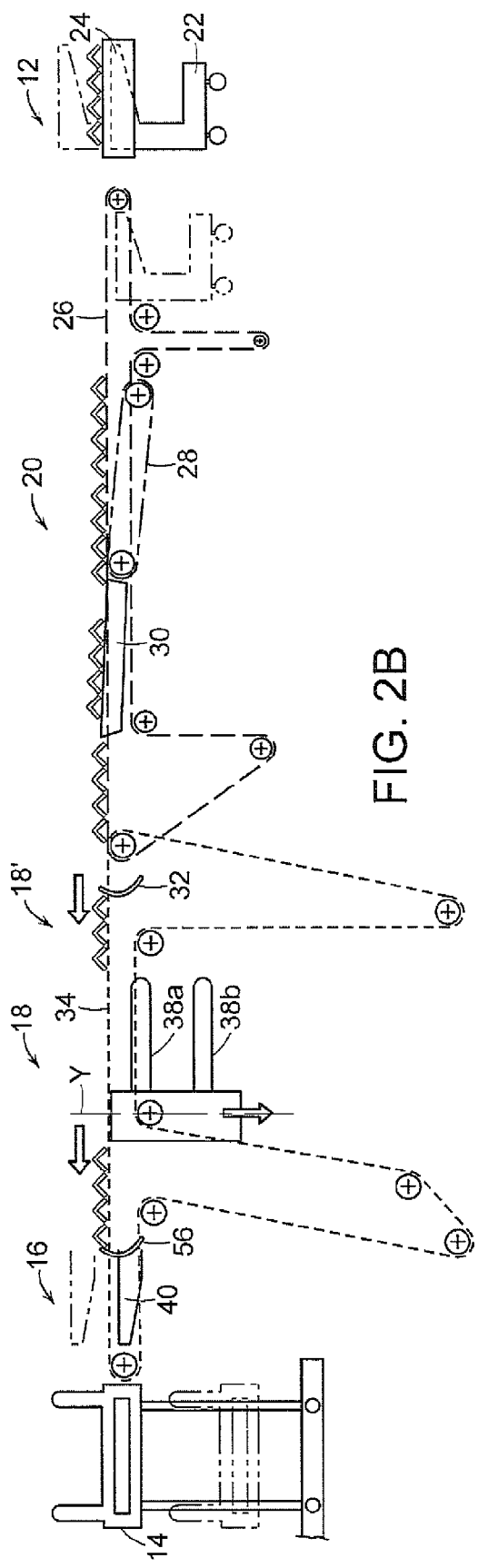

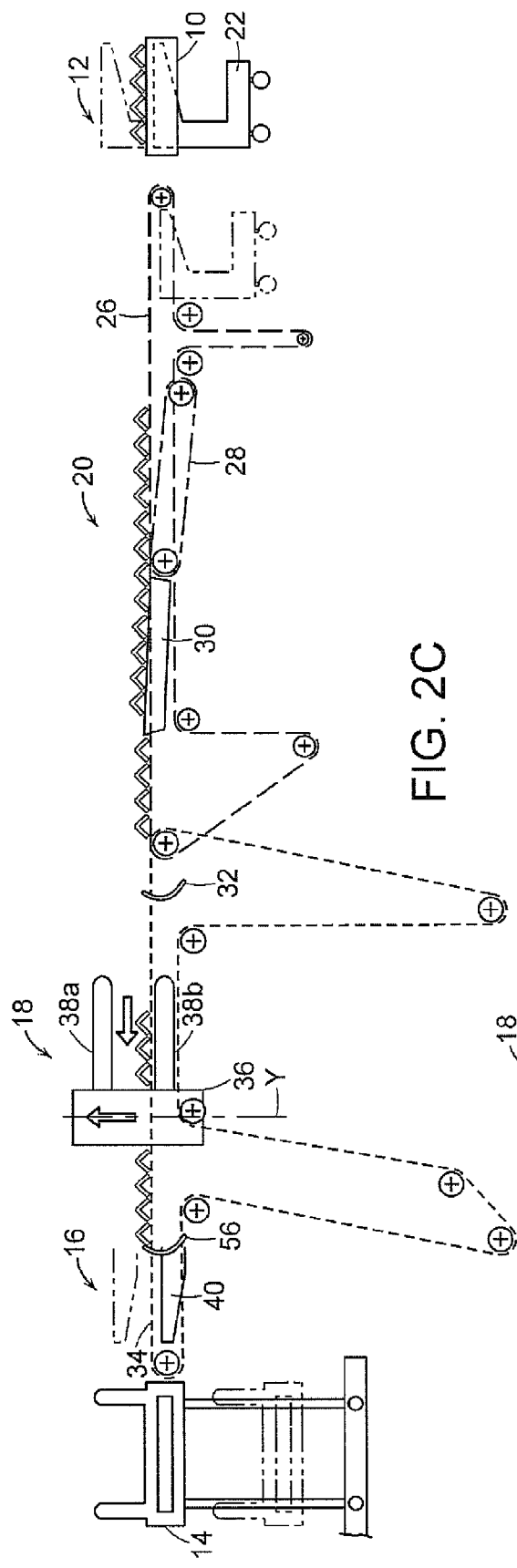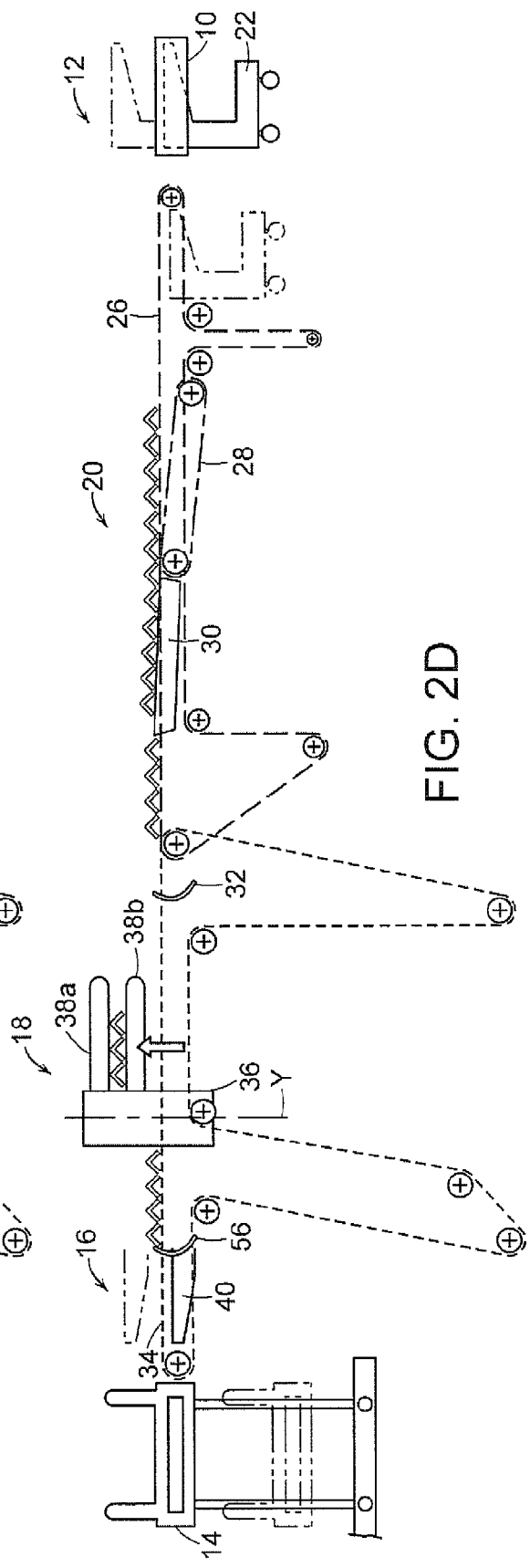

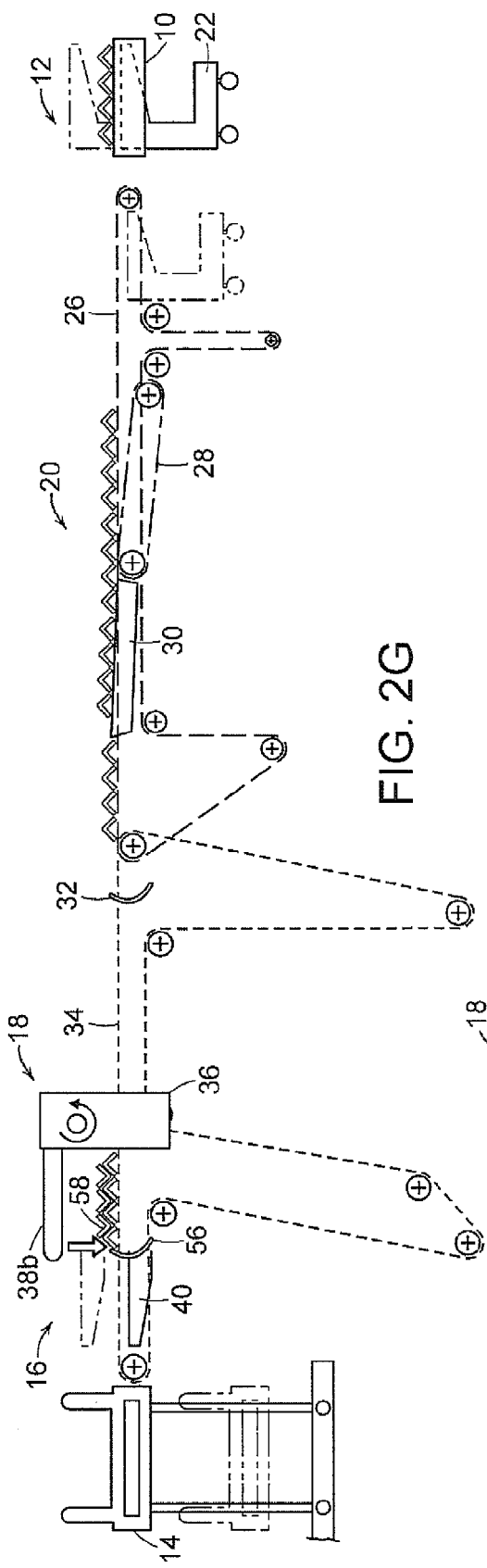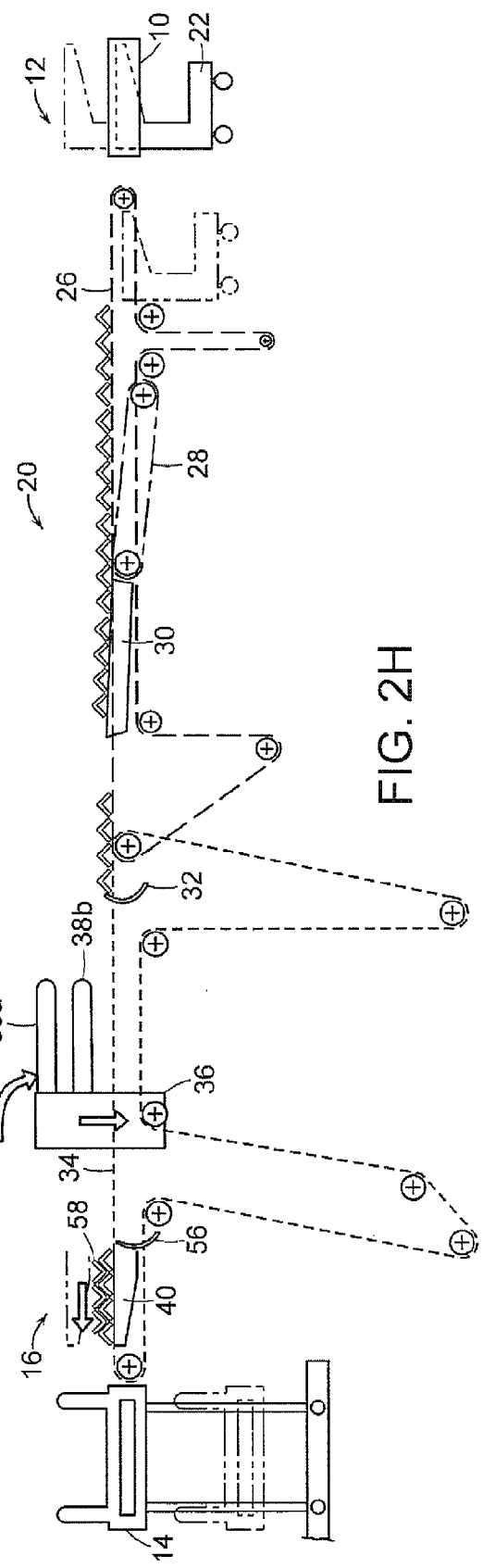

BUNDLING SYSTEM FOR LONG PRODUCTS

BACKGROUND DISCUSSION

1. Field of the Invention

This invention relates to the handling of long products produced by a rolling mill, and is concerned in particular with the bundling of such products.

2. Description of the Prior Art

As herein employed, the term "long products" is intended to include squares, flats, angles, channels, beams, and any other like products that are typically formed into layered bundles.

In the conventional bundling system, long products are delivered to a receiving station. A transport system then carries the products laterally to a stacker. In the course of being laterally carried, the products are subdivided into layers.

The stacker operates to transfer the layers individually into a cradle, where the layers are stacked to form a bundle. The bundle is then tied or strapped.

The stacker typically requires an average of about 12 seconds to transfer each layer into the cradle. This transfer cycle is substantially longer than the time it takes for the transport system to deliver successive product layers to the stacker. Thus, the stacker represents a bottleneck limiting the rate at which bundles can be formed by the bundling system.

The objective of the present invention is to relieve this bottleneck and thus increase the overall production rate of the bundling system.

SUMMARY OF THE INVENTION

In accordance with the present invention, a pre-stacker is positioned between the receiving station and the stacker. The pre-stacker is constructed and arranged to operate in concert with the transport system to pre-stack multiple product layers into sub-bundles. The sub-bundles are delivered to the stacker, which transfers the sub-bundles into the cradle. By delivering multiple product layers to the cradle during each transfer cycle, the stacker's efficiency is increased significantly, with a corresponding increase in the rate at which bundles are formed.

The invention will now be described in greater detail with reference to the accompanying drawings, wherein:

BRIEF DESCRIPTION OF THE DRAWINGS

FIGS. 1A-1F are schematic illustrations depicting a bundling system in accordance with the present invention during the bundling of flats;

FIGS. 2A-2I are similar views showing the bundling angles; and

DETAILED DESCRIPTION

Figure 1E:
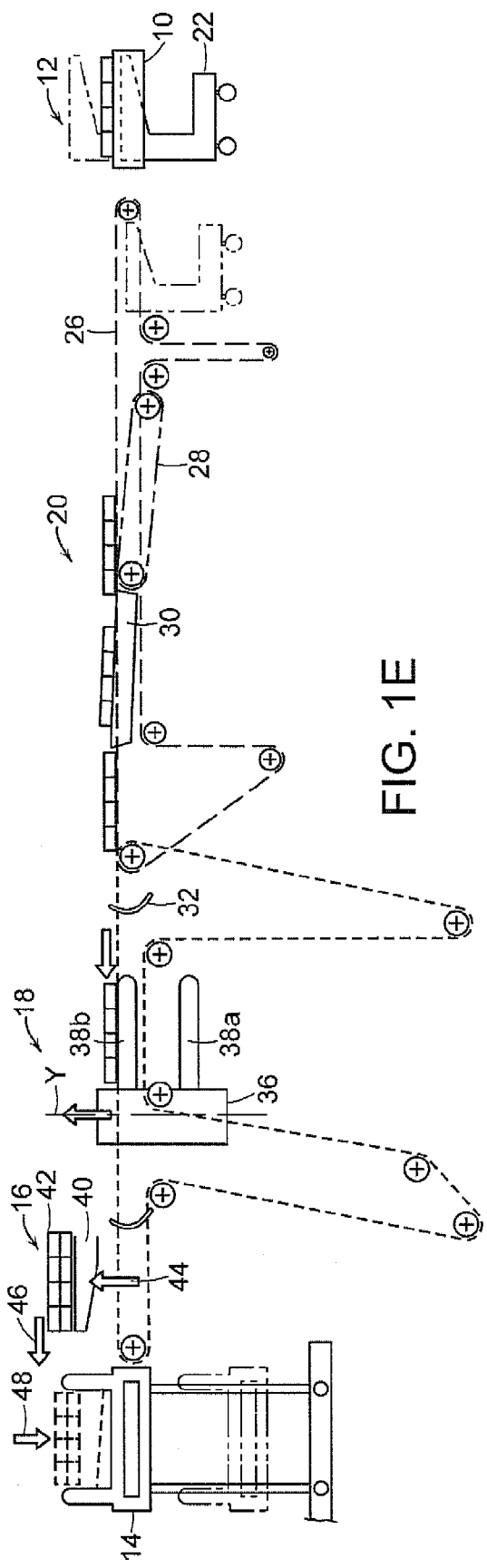

With reference initially to FIG. 1A, a stacking system in accordance with the present invention comprises a roller table 10 for delivering long products longitudinally to a receiving station 12. A cradle 14 is spaced laterally from the receiving station 12. The cradle is constructed and arranged in a known manner to receive and accumulate product layers in bundle form.

A stacker 16 and an adjacent pre-stacker 18 are positioned between the cradle 14 and the receiving station 12. A transport system 20 operates to laterally advance products from the receiving station 12 to the pre-stacker 18.

The transport system 20 includes a transfer car 22 with an elevator platform having arms 24 vertically adjustable between the gaps of the rollers of the roller table 10.

As shown in FIG. 1A, the arms 24 are beneath long products (in this case flats) on the roller table. In FIG. 1B, the arms have been elevated to raise the products off of the roller table. In FIG. 1C, the transfer car has been shifted laterally to position the raised arms between the chains of a buffer chain conveyor 26. In FIG. 1D, the arms have been lowered to deposit the products on the buffer chain conveyor.

The buffer chain conveyor is operable to move several layers of products to a selector chain conveyor 28 on which separate product layers made up of pre-selected numbers of products are isolated from the remaining products by a set of pivotal lifting plates 30 acting in concert with stops 32. The separate product layers are then carried by a feeding chain conveyor 34 to the pre-stacker 18.

The pre-stacker comprises a base 36 that is both vertically adjustable along and rotatable about axis "Y". The base is also rotatable about an axis "X" perpendicular to axis Y.

Upper and lower fingers 38a, 38b are carried by the base 36. The fingers are adjustable vertically, both with respect to each other as well as together.

Figure 1F:
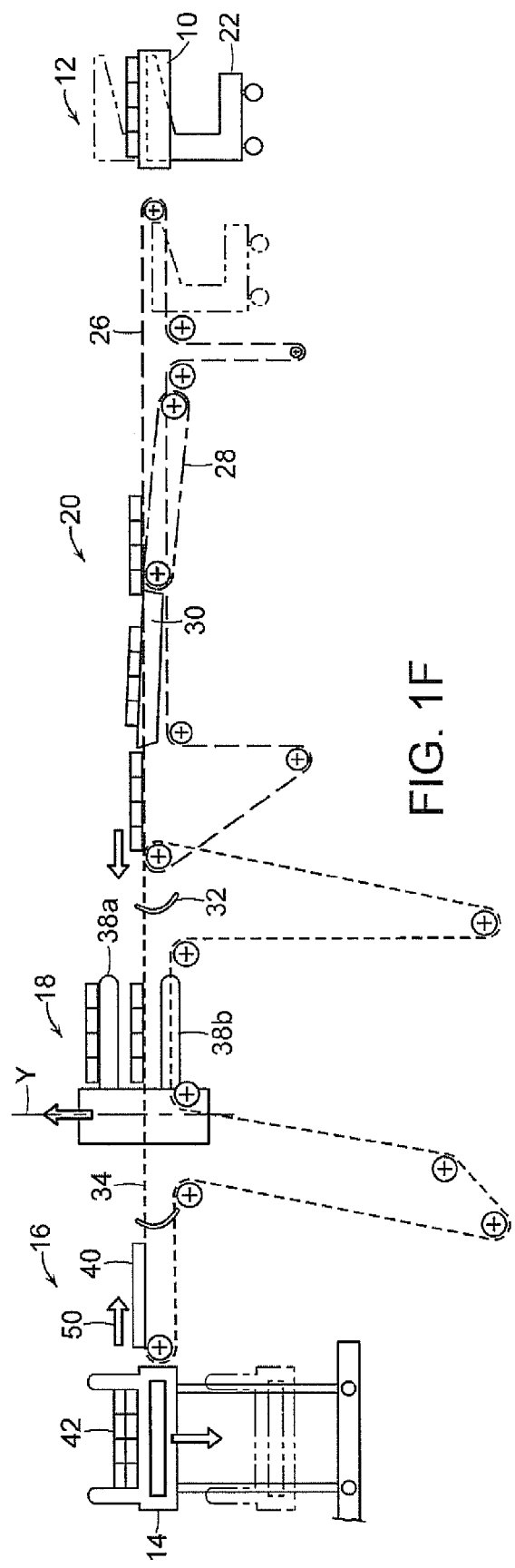

The stacker 16 comprises arms 40 that are adjustable in a transfer cycle between a receiving position as shown in FIG. 1A and a delivery position as shown in FIG. 1F.

A pre-stacking cycle for flats begins as shown in FIG. 1A, with a first layer of products being shifted by conveyor 34 to a position above the upper fingers 38a. Next, as shown in FIG. 1B, the base 36 is elevated to raise the fingers 38a and the first product layer above conveyor 34, with the conveyor then operating to shift a second product layer to a position between the upper and lower fingers 38a, 38b. Then, as shown in FIG. 1C, the upper fingers 38a are rotated through 90° about axis Y, resulting in the first product layer being deposited on the underlying second product layer to thereby form a sub-bundle 42.

As shown in FIG. 1D, the base 36 is then lowered and the fingers 38a, 38b repositioned in readiness for the beginning of the next pre-stacking cycle. At the same time, the sub-bundle 42 is shifted on conveyor 34 to a position overlying the stacking arms 40. As shown in FIG. 1E, the stacking arms are then operated through a transfer cycle in which they are raised (arrow 44), advanced (arrow 46) and lowered (arrow 48) to a delivery position slightly above either the base of cradle 14 or the top layer of a previously deposited sub-bundle (broken lines in FIG. 1E). The stacker arms are then twisted through 90° about their axes before being retracted (arrow 50 in FIG. 1F) to thereby strip off the layers of the sub-bundle 42 against the nearest vertical arm of the cradle, thus depositing the sub-bundle in the cradle.

The stacking arms are then returned to the receiving position in readiness to receive the next sub-bundle.

It will be seen from FIGS. 1E and 1F that the transfer cycle of the stacker 16 is overlapped by the pre-stacking cycle of the pre-stacker 18. In other words, while the stacker 16 is in the process of transferring one sub-bundle 42 into the cradle 14, the pre-stacker 18 is in the process of pre-stacking additional product layers into the next sub-bundle.

As each sub-bundle is deposited in the cradle 14, the cradle is lowered incrementally (arrow 54 in FIG. 1F) until a full bundle has been accumulated. The bundle is then tied or strapped by other known apparatus (not shown) and taken away.

Figure 2E:
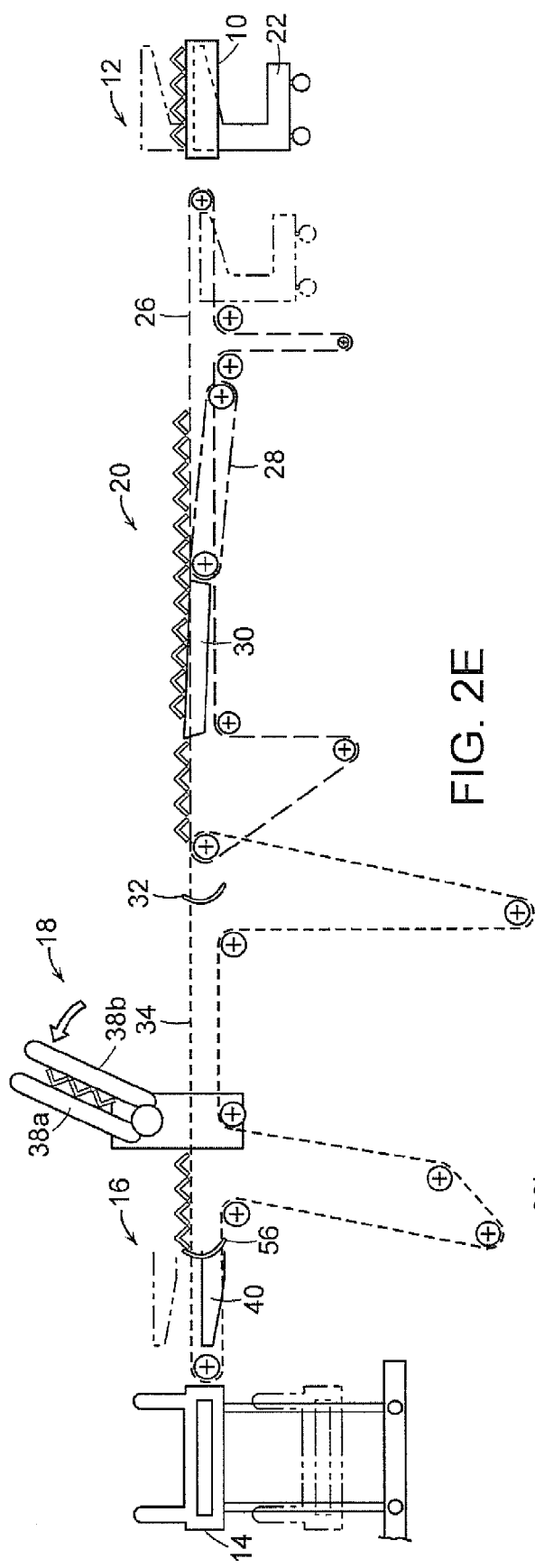
Figure 2F:
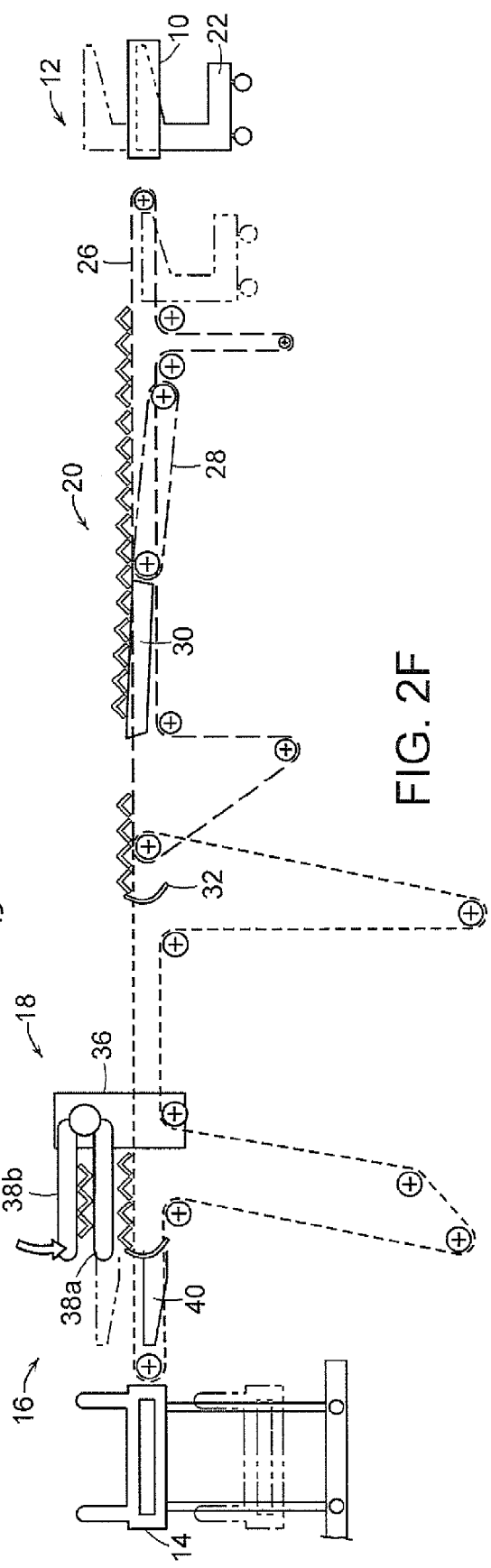
Figure 21:
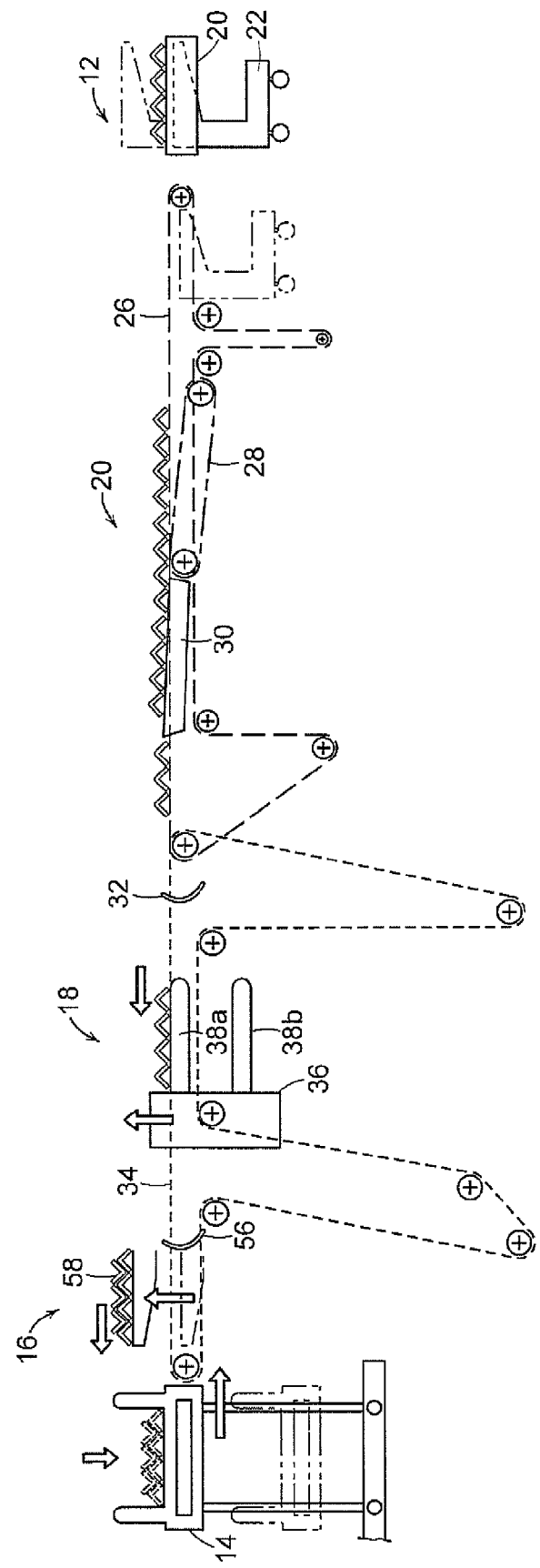

FIGS. 2A-2H illustrate the bundling of angles. The operation of the transfer car 22 and other components of the transport system 20 in essentially the same as described previously with respect to the bundling of flats. However, the operation of the pre-stacker 18 is somewhat different when handling angles. More particularly, as shown in FIG. 2A, a first layer of four angles is initially carried by conveyor 34 to a position overlying the pre-stacker's upper fingers 38a and abutting the base 36. In FIG. 2B, the base 36 has been lowered to clear the way for further transfer of the first product layer to a holding position against a stop 56. At the same time, a second product layer of three angles is advanced towards the pre-stacker.

In FIG. 2C, the base 36 has been returned to its upper position, and the second layer of angles has been received between the fingers 38a, 38b.

In FIG. 2D, the lower fingers 38b have been raised to elevate the second product layer off of the conveyor 34, resulting in the second product layer being gripped between the fingers 38a, 38b. As shown in FIG. 2E, the fingers 38a, 38b with the second product layer gripped therebetween, are rotated about axis X to the position shown in FIG. 2F, thus inverting the second product layer.

Next, as shown in FIG. 2G, the upper fingers 38a are rotated 90° about axis Y to deposit the inverted second product layer on the first product layer, thereby forming a sub-bundle 58 in which the inverted angles of the second layer are nested into the angles of the first layer.

As shown in FIG. 2H, the upper and lower fingers 38a, 38b are then repositioned to their receiving positions, and the base 36 is lowered. At the same time, the stop 56 is lowered and the sub-bundle 58 is shifted by conveyor 34 to a position overlying the stacker alms 40.

As shown in FIG. 2I, the stacker then operates through its transfer cycle, as previously described, to deposit the sub-bundle in the cradle 14. While this is taking place, the pre-stacker is again in the process of forming the next sub-bundle, which will be ready for transfer to the stacker arms 40 when they are returned to their receiving position.

Figure 3:
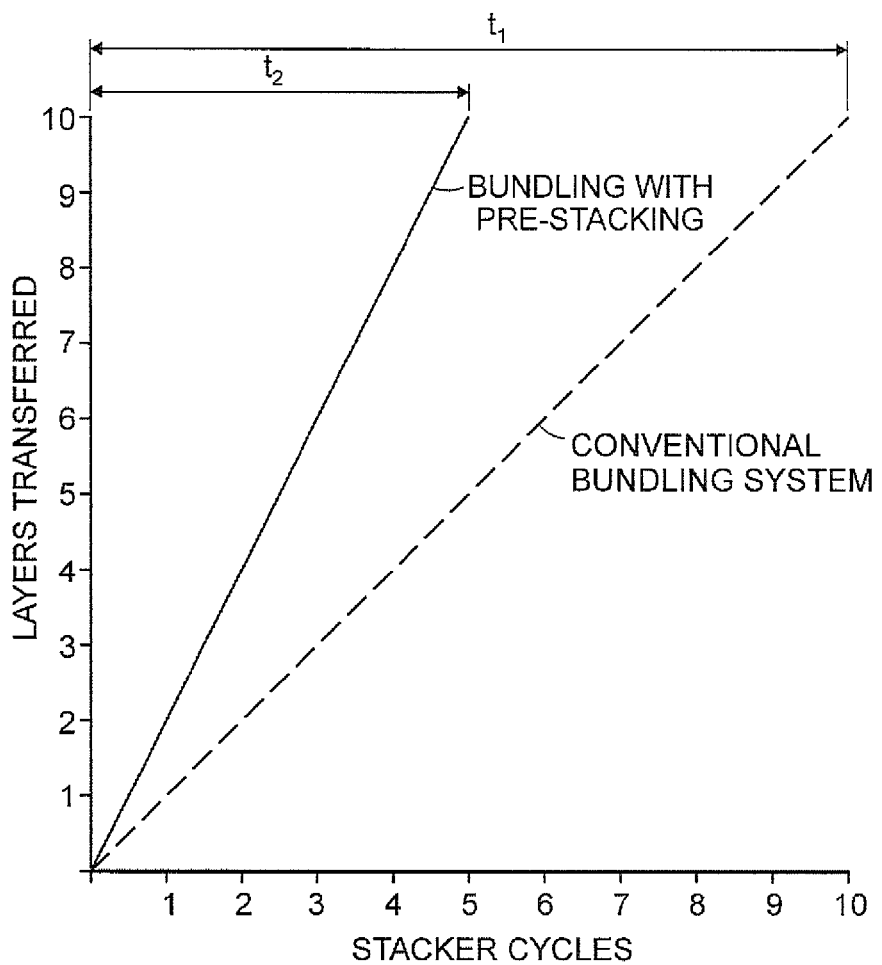
FIG. 3 is a graph comparing the efficiency of the bundling system of the present invention with that of a typical conventional system.

With reference to FIG. 3, and using as an example the formation of a bundle containing ten product layers, a conventional bundling system, which transfers one layer per cycle of the stacker, will require time t, to complete the bundle. In contrast, a system in accordance with the present invention that pre-stacks two layers into sub-bundles, will complete the bundle in a significantly shorter time $t_2$, i.e., in approximately one half the time required by the conventional system.

It will be seen therefore, that the present invention substantially increases the overall efficiency of the bundling system by taking much better advantage of the stacker's transfer cycle.

It is also important to note that the bundling system of the present invention manipulates the stacked products without employing magnets. The system is thus capable of handling non-magnetic products, e.g., stainless steel bars and the like, and bundled magnetic products are not plagued with residual magnetization.

We claim:

1. A method of operating a system for bundling long ferrous products wherein said system comprises:
    a roller table for delivering said products longitudinally to a receiving station;
    a cradle spaced laterally from said receiving station, said cradle being constructed and arranged to receive and accumulate said products in bundle form;
    a stacker positioned between said receiving station and said cradle;
    a transport system for laterally advancing products along a horizontal path from said receiving station to said stacker; and
    a pre-stacker positioned between said stacker and said receiving station, said pre-stacker having a base vertically adjustable along and rotatable about an axis perpendicular to said path, and having vertically spaced upper and lower fingers projecting horizontally from said base;
    said method comprising the steps of:
        (i) lowering said base along said axis to a position at which said upper fingers are below said path;
        (ii) operating said transport system to deliver a first layer of said products along said path to a position overlying said upper fingers;
        (iii) raising said base along said axis to a position at which said first layer of products is elevated above said path and supported on said upper fingers;
        (iv) operating said transport system to deliver a second layer of said products along said path to a position underlying said upper fingers;
        (v) rotating said base about said axis to remove said upper fingers from beneath said first layer of products and to deposit said first layer of products on said second layer of products to thereby form a sub-bundle; and
        (vi) lowering said base along said axis to a position beneath said path;
        (vii) operating said transport system to convey said sub-bundle to said stacker; and
        (viii) operating said stacker to deposit said sub-bundle in said cradle.

2. The method of claim 1 wherein said system alternatively comprises the steps of:
    (i) lowering said base along said axis to a position underlying said path;
    (ii) operating said transport system to deliver a first layer of said products to said stacker;
    (iii) raising said base along said axis to a position at which said upper and lower fingers are positioned respectively above and below said path;
    (iv) operating said transport system to deliver a second layer of said products along said path to a position between said upper and lower fingers;
    (v) gripping said second layer of products between said upper and lower fingers;
    (vi) rotating said first and second fingers and the second product layer gripped therebetween in unison about a second axis transverse to said first mentioned axis to transfer said second layer of products to an inverted position supported on said first fingers and overlying said first layer of products;
    (vii) rotating said upper fingers about said axis to remove said upper fingers from beneath said first layer of products, thus deposition said first layer of products on said second layer of products to thereby form a sub-bundle in said stacker;
    (viii) returning said base and said fingers to the position of step (i); and
    (ix) operating said stacker to deposit said sub-bundle in said cradle.

* * * * *